3,078,303
PURIFICATION OF AROMATIC
CARBOXYLIC ACIDS
William A. Sweeney, San Rafael, Calif., assignor to California Research Corporation, San Francisco, Calif., a corporation of Delaware
No Drawing. Filed Mar. 27, 1959, Ser. No. 802,310
2 Claims. (Cl. 260—525)

This invention relates to improvement in crystal size and purification of normally solid organic carboxylic acids and mixtures thereof.

Whereas normally solid organic carboxylic acids produced by many processes often are in a powdery form, and contain many impurities, larger crystal sizes and higher purities frequently are necessary in many of the uses to which the acids are put. This is especially important in the case of the phthalic acids. It is often a firm necessity that isophthalic and terephthalic acids, for example, be of high purity, as when these acids are to be used in the preparation of such products as alkyd resins and synthetic fibres. It is particularly important that terephthalic acid be of high purity when it is to be used in the manufacture of high molecular weight polymeric esters for use in textile fibre spinning. Such esters may be produced, for example, by condensation of terephthalic acid or its methyl ester with ethylene glycol, to yield a polymeric ester variously called Terylene, Fiber V, and Dacron.

Normally, solid organic polycarboxylic acids may be prepared by various conventional processes. For example, phthalic acids may be prepared by oxidizing dialkyl benzenes with oxygen in a liquid medium, from which crude phthalic acids are precipitated, or by using an aqueous oxidizing medium containing a sulfur species. Various means have been proposed to purify the crude organic acids produced by such processes, for example aqueous systems from which impurities are removed by adsorbents. Such aqueous systems are important because they are economical, but serious disadvantages are apparent in their use. These disadvantages include the difficulty in dissolving sufficient quantities of the acids, the small acid crystal size that results upon recrystallization of the acids, the need for regeneration of the acids by chemical means such as springing them with a mineral acid or precipitating them from solution with a sulfate, for example, and the net chemicals consumption that often is necessary. It has been found that by use of the process of the present invention the foregoing difficulties can be substantially reduced.

In accordance with the present invention there is provided a process for improving the quality of a crude, normally solid organic carboxylic acid, which comprises forming a solution comprising said acid, water and a heterocyclic nitrogen compound selected from the group consisting of pyridine and substituted pyridines that will form azeotropes with water, particularly the alkyl-substituted pyridines, and especially the methyl-substituted pyridines, said solution containing about from 30% to 95% water by volume, thermally separating said solution into an azeotropic fraction containing water and a major portion of said heterocyclic compound and an aqueous fraction containing treated acid, and recovering said treated acid from said latter fraction. Also in accordance with the invention, impurities in the crude acid are released from the solid acid into said solution when the acid is dissolved, and may be removed from said solution prior to separating said heterocyclic compound therefrom. As an alternative method of impurity removal, before adding enough water to amount to 30% to 95% by volume, a prior solution of said acid and said heterocyclic nitrogen compound may be formed containing less than 30% water by volume, and preferably no water in this alternative, and impurities released from the solid acid into this prior solution may be removed therefrom prior to the addition of enough water thereto to bring the water content thereof up to the desired 30% to 95% by volume.

It has been found with operation in the foregoing manner that: (1) larger amounts of acid can be dissolved for a given amount of solvent used than is possible in conventional processes, (2) many impurities in the acid can be reduced to such a level that the purified acid is essentially free of these impurities, (3) regardless of the degree of fineness of the impure starting acid crystals there can be produced purified acid crystals of relatively large size compared with crystals produced by conventional processes, (4) the acid can be regenerated by physical rather than chemical means, and (5) the process is operable with no net chemicals consumption; the heterocyclic compound can be recovered and re-used in the process.

The process of the present invention is operative for the purification and crystal size improvement of any normally solid organic carboxylic acids, including substituted derivatives thereof, although acids that are much stronger than the phthalic acids are less desirable as feeds to the process. The acids to which the process of the present invention may be applied with beneficial results include those acids, including substituted derivatives thereof, in the following classes, that are normally solid: aliphatic monocarboxylic acids, aliphatic dicarboxylic acids, aromatic monocarboxylic acids such as benzoic and toluic acids, aromatic polycarboxylic acids including the phthalic acids, and cycloaliphatic acids. The acids used should have a melt point above the boiling point of the water-nitrogen compound azeotrope to be formed in the process in order to obtain good crystal formation upon regeneration of the acids. Acids that have a reasonably low solubility in water are especially amenable to purification and crystal size increase when treated pursuant to the process of this invention, in that they permit easy separation of a distinct acid phase from the nitrogen compound following purification. Especially good results have been obtained in the purification and crystal size increase of the phthalic acids.

The impurities that are removable from the crude acids pursuant to the process of the present invention include all of those non-acidic elements and compounds that are insoluble in the acid-water-nitrogen compound solution prepared in the initial stages of the process. These elements and compounds include sulfur, various metals such as iron, nickel and chromium, and salts of these metals.

Impurity removal from a solution prepared as described above, containing either more or less than 30% water by volume, may be accomplished by treating the solution prior to distillation thereof with at least one treatment step selected from the group consisting of filtration to remove those impurities such as iron and iron salts that are released from the crude phthalic acid when the acid goes into solution, adsorbent treating with a solid adsorbent, such as activated charcoal, silica, alumina, or silica-alumina, solvent treating with a water-immiscible solvent, such as petroleum ether or carbon tetrachloride, to remove impurities such as color bodies, organic nonacidic impurities, metals and sulfur, hydrogenation to convert such compounds as sulfur to more easily removable compounds, and treating with a bleaching agent, for example sodium hypochlorite or permanganate, to remove color bodies. Removal of metal ions by the foregoing types of treatment may be facilitated by first forming insoluble complexes of the metal ions, for example by adding small amounts of thiocyanate ion. It is known that iron, nickel and cobalt, for example, form insoluble complexes with pyridine and thiocyanate ion, and these complexes may be removed from the solution to be treated by one or a combination of the foregoing types of treatment.

It has been found that the solution formed by dissolving the acid in an aqueous mixture comprising water and a heterocyclic nitrogen compound should consist, prior to distillation, essentially of water, acid and the heterocyclic compound, and that it must contain about from 30% to 95%, and preferably about from 50% to 90%, water by volume, in order that the major benefits of the process of the present invention may be achieved. This much water, when combined with the necessary heterocyclic nitrogen compound, permits adequate quantities of the acid to be dissolved, and permits adequate formation of the necessary water-nitrogen compound azeotrope. Assuming the volume of dissolved acid to be a minor part of the volume of the solution, and substantially all of the remainder of the solution to be heterocyclic nitrogen compound, as is preferred, the nitrogen compound accordingly will be about from 5% to 70% of the solution, by volume.

Pyridine and its methyl substituted derivatives have a unique combination of properties that make them especially efficacious in the process of the present invention. Their low base strength probably accounts for the ease with which they can be separated from the acids in an azeotrope with water. On the other hand, a weaker base would be much less effective in dissolving the acids. Pyridine itself has an advantage over the picolines in that it is substantially unreactive in the present process. On the other hand, the picolines, while perhaps slightly reactive, are slightly stronger bases and are more effective in dissolving the acids. The lutidines are especially effective in dissolving the acids. Chloro, methoxy and other substituents that are substantially inert in the process may be present on the heterocyclic nitrogen compound without detracting from the operativeness and efficiency of the process.

The solubility of the acid in the solution increases with temperature and with increasing concentrations of the nitrogen compound in the solution, and also varies with the type of nitrogen compound used. With no nitrogen compound present, terephthalic acid, for example, is extremely insoluble in water. Its solubility in water alone is substantially zero at room temperature, and is only 00.3 grams/100 ml. of water at 212° F., and 0.3 grams/100 ml. of water at 392° F. However, in a water-pyridine solution containing 15% pyridine by volume of solution, its solubility at 200° F. is 3.0 grams/100 ml. of solution, in a water-$\alpha$-picoline solution containing 25% $\alpha$-picoline by volume of solution its solubility at 200° F. is 10–11 grams/100 ml. of solution, and in a water-2,6-lutidine solution containing about 42% 2,6-lutidine by volume of solution its solubility at 200° F. is about 16 grams/100 ml. of solution.

The increase in acid crystal size obtainable pursuant to the process of the present invention is attributable to the separation of the azeotropic fraction of aqueous nitrogen compound. The removal of this fraction from the acid-water-nitrogen compound solution permits good crystal growth to be obtained, in contrast to processes wherein an ingredient is added to such a solution to cause acid crystals to precipitate out of solution. In the latter case there is insufficient time for growth of crystals of the size obtainable with the process of the present invention. The azeotropic fraction separated in the present process will contain a substantial amount of the nitrogen compound, and the entire fraction may be recycled to the process. Any residual nitrogen left on the acid crystals may be washed therefrom with added fresh water, and also recycled to the process, together with the added fresh water. Thus the advantages of the invention are obtainable with no net chemicals consumption. The azeotropic fraction when pyridine itself is used will have a boiling point of 198.7° F., and will contain 43 weight percent pyridine. The monomethyl pyridines (picolines) and the dimethyl pyridines (lutidines) will form water azeotropes boiling within a range of about 198–203° F., and containing about from 40% to 60% methyl pyridines by volume.

The following examples will serve to further illustrate the process of the present invention and the advantages to be gained therefrom.

Example I

The isophthalic acid charge shown below was treated in Runs 1 and 2 with the results shown. In each run a solution of 1000 cc. water, 166 grams of the isophthalic acid and the nitrogen compound shown was formed having a temperature of about 203° F. In each run the solution was then treated with 3.3 grams of powdered carbon and mixed for 30–45 minutes. In each run the solution was then filtered and a water-nitrogen azeotropic fraction was distilled off to leave an aqueous slurry of purified acid crystals, which were recovered from the solution after being washed with additional quantities of water to remove residual amounts of the nitrogen compound. In each run product acid crystals in the form of long needles were recovered in an amount greater than 92 weight percent of the original acid.

|  | Isophthalic acid charge | Isophthalic acid product | |
|---|---|---|---|
|  |  | Run 1—216 g. pyridine | Run 2—250 g. $\alpha$-picoline |
| Crystal size: |  |  |  |
| Percent through 100 mesh screen |  | 12.5 |  |
| Percent through 200 mesh screen | 26 max | 1.2 |  |
| Percent through 325 mesh screen | 8 max |  |  |
| Metals, p.p.m.: |  |  |  |
| Chromium | 21 | 3 | 9 |
| Iron | 10 | 10 | 12 |
| Nickel | 4 | N 0.1 | 0.4 |
| Sulfur, Wt. percent | 0.012 | 0.003 | 0.004 |
| Color, percent saturation[1] | 8.5 | 4.0 |  |

[1] By conventional color analysis, in this case using a Lumetron tri-stimulus colorimeter.

Example II

The terephthalic acid charge shown below was treated in Runs 3 and 4 with the results shown. In Run 3 a 4000 litre solution was formed at 170° F. containing 146 grams of terephthalic acid and 453 grams of pyridine. The solution was then treated with 5.8 grams of powdered carbon and mixed for about 20 minutes, following which acid crystals were recovered from the solution as in Example I. In Run 4 a solution of 1500 cc. water, 227 grams of terephthalic acid and 445 grams of $\alpha$-picoline was formed having a temperature of 167–176° F. The solution was treated with about 11.5 grams of powdered carbon and mixed for about 30 minutes, following which acid crystals were recovered from the solution as in Example I. In each run product acid crystals in the form of long needles were recovered. Based on the original acid, the amount of product acid recovered was above 90 weight percent in Run 3 and was 94.8 weight percent in Run 4.

|  | Terephthalic acid charge | Terephthalic acid product | |
|---|---|---|---|
|  |  | Run 3 | Run 4 |
| Crystal size: |  |  |  |
| Percent through 100 mesh screen |  | 29.1 | 16.4 |
| Percent through 200 mesh screen | 26 max | 7.3 | 7.3 |
| Percent through 325 mesh screen | 8 max |  |  |
| Metals, p.p.m.: |  |  |  |
| Chromium |  | 10 | 0.2 | 2.7 |
| Iron |  | 13 | 0.2 | 9.6 |
| Nickel |  | 0.4 | 0.1 | [1] 2.4 |
| Sulfur, Weight percent |  | 0.02 | 0.002 | 0.003 |
| Color, percent Saturation [2] |  | 25 | 2 | 3 |

[1] Apparently carbon used was not pure, but contained metallic impurities including nickel, which formed a complex with the α-picoline and then precipitated out when the α-picoline was removed.
[2] By conventional color analysis, in this case using a Lumetron tristimulus colorimeter.

All variations and modifications of the above-described invention that are within the spirit and scope thereof are intended to be covered by the appended claims if not expressly excluded by the limitations thereof.

What is claimed is:

1. A process for improving the quality of a crude normally solid acid selected from the group consisting of benzoic, toluic and phthalic acids, said crude acid being contaminated with non-acidic impurities which contain at least one of the elements selected from the group consisting of sulfur, iron, nickel and chromium, which process comprises: (a) dissolving said crude acid in an aqueous medium consisting essentially of about 30 to 95 percent by volume of water and about 70 to 5 percent by volume of a nitrogen compound selected from the group consisting of pyridine and alkyl substituted pyridines: (b) contacting said solution with a solid adsorbent selected from the group consisting of activated carbon, alumina, silica and silica-alumina; (c) mechanically separating said adsorbent from said solution; (d) regulating the composition of said solution so that it contains from about 30 to 95 percent by volume of water; (e) distilling the last named solution to separate therefrom as an overhead fraction an azeotropic mixture containing water and a major proportion of said nitrogen compound and thereby form as a distillation residue an aqueous slurry containing crystals of said acid; and (f) recovering said acid crystals from said aqueous slurry.

2. A process for improving the quality of crude terephthalic acid contaminated with non-acidic impurities which contain at least one element selected from the group consisting of sulfur, iron, nickel and chromium and which are insoluble in aqueous pyridine solutions, which process comprises dissolving said crude acid in an aqueous medium consisting essentially of 30 to 95 percent by volume of water and 70 to 5 percent by volume of pyridine, contacting said solution with activated carbon to adsorb insoluble impurities therefrom, separating said carbon from said solution, regulating the composition of said solution so that it contains from about 30 to 95 percent by volume of water, distilling the last named solution to separate therefrom as an overhead fraction an azeotropic mixture containing water and a major proportion of said pyridine and thereby form as a distillation residue an aqueous slurry containing crystals of free terephthalic acid, and recovering said acid crystals from said slurry.

References Cited in the file of this patent

UNITED STATES PATENTS

| 2,664,440 | Toland | Dec. 29, 1953 |
| 2,829,160 | Stehman et al. | Apr. 1, 1958 |
| 2,981,680 | Binning | Apr. 28, 1961 |

FOREIGN PATENTS

| 726,675 | Great Britain | Mar. 23, 1955 |
| 786,897 | Great Britain | Nov. 27, 1957 |

OTHER REFERENCES

Lecat: Ann. Soc. Sci. Bruxelles, 61, 63 (1947).
Horsley: Azeotropic Data, p. 8 (1952).